United States Patent
Timmins

[11] Patent Number: 6,012,891
[45] Date of Patent: Jan. 11, 2000

[54] PARTS HANDLING APPARATUS

[75] Inventor: Lawrence J. Timmins, Riverview, Mich.

[73] Assignee: Chrysler Corporation, Auburn Hills, Mich.

[21] Appl. No.: 09/105,421

[22] Filed: Jun. 26, 1998

[51] Int. Cl.[7] .................................................. B65G 65/23
[52] U.S. Cl. ........................................... 414/421; 414/414
[58] Field of Search .................................. 414/404, 414, 414/419, 421, 425, 778

[56] References Cited

U.S. PATENT DOCUMENTS

| | | | |
|---|---|---|---|
| 2,872,058 | 2/1959 | Doepke et al. | 414/421 |
| 2,916,164 | 12/1959 | Avery | 214/1 |
| 3,042,237 | 7/1962 | Dole | 214/314 |
| 3,200,974 | 8/1965 | Ciraolo | 414/421 |
| 3,265,231 | 8/1966 | Thomas | 414/414 |
| 3,702,660 | 11/1972 | Berger | 214/1 |
| 3,753,505 | 8/1973 | Ouska | 214/1 |
| 3,767,073 | 10/1973 | DeGreef | 414/421 |
| 3,795,323 | 3/1974 | Ouska | 214/1 |
| 3,844,615 | 10/1974 | Anderson | 298/10 |
| 3,899,095 | 8/1975 | Wiese | 214/302 |
| 3,942,663 | 3/1976 | Wentzel | 214/313 |
| 4,215,968 | 8/1980 | Rymer | 214/421 |
| 4,293,264 | 10/1981 | Gilts et al. | 414/38 |
| 4,295,776 | 10/1981 | Payne et al. | 414/405 |
| 4,370,087 | 1/1983 | Shepard | 414/421 |
| 4,447,185 | 5/1984 | Robinson et al. | 414/420 |
| 4,946,331 | 8/1990 | Johnson | 414/421 |
| 5,302,073 | 4/1994 | Riemersma et al. | 414/421 |
| 5,310,302 | 5/1994 | Ferguson, Sr. | 414/424 |
| 5,538,389 | 7/1996 | Stone | 414/778 |
| 5,540,534 | 7/1996 | Wolf et al. | 414/400 |
| 5,558,485 | 9/1996 | Haynes | 414/421 |
| 5,720,591 | 2/1998 | Ledet | 414/778 |

FOREIGN PATENT DOCUMENTS

| | | |
|---|---|---|
| 5540147 | 3/1980 | Japan . |
| 2223733 | 4/1990 | United Kingdom . |

*Primary Examiner*—Dean J. Kramer
*Attorney, Agent, or Firm*—Lawerence J. Shurupoff

[57] ABSTRACT

Loose parts in a shipping container can be dumped onto a table at a work station using a pivotal carrier. With the carrier in an upstanding position, a loaded shipping container can be transported into the carrier by the use of a fork lift truck. A lid on the carrier can then be lowered onto the container to retain the loose parts in place while the carrier is being pivoted to a tilted position. The lid has a parts discharge opening and a slidable closure plate that can be moved between a closed position and various partially-opened positions, to control the number of parts discharged from the container onto the work station table at any one time.

11 Claims, 2 Drawing Sheets

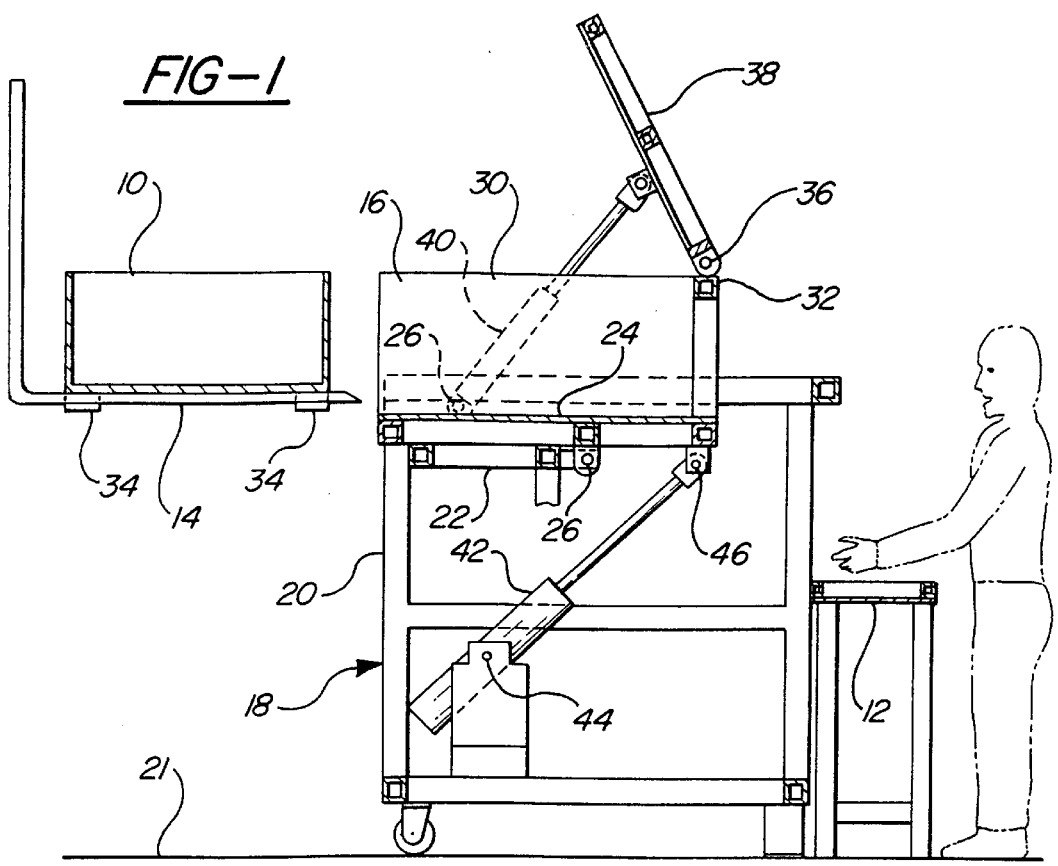
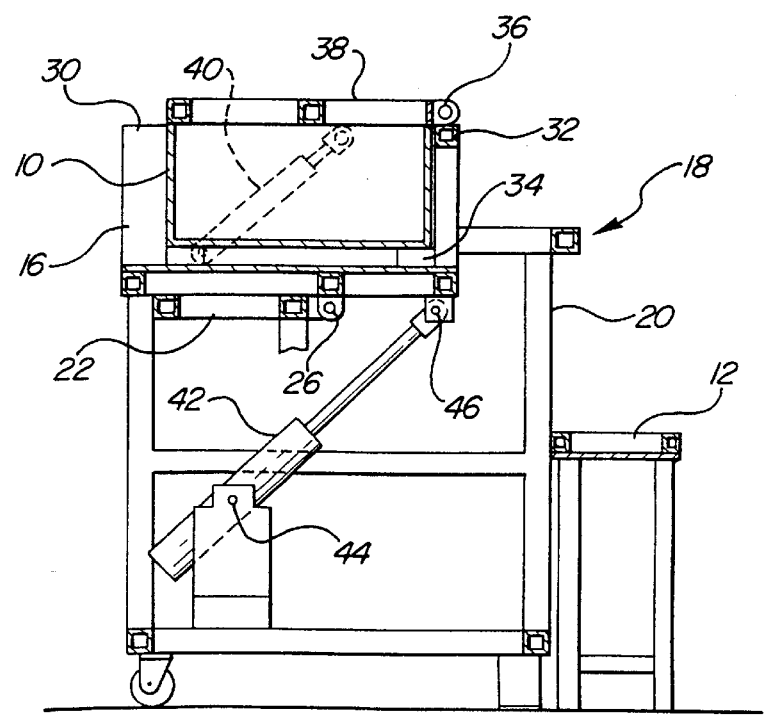

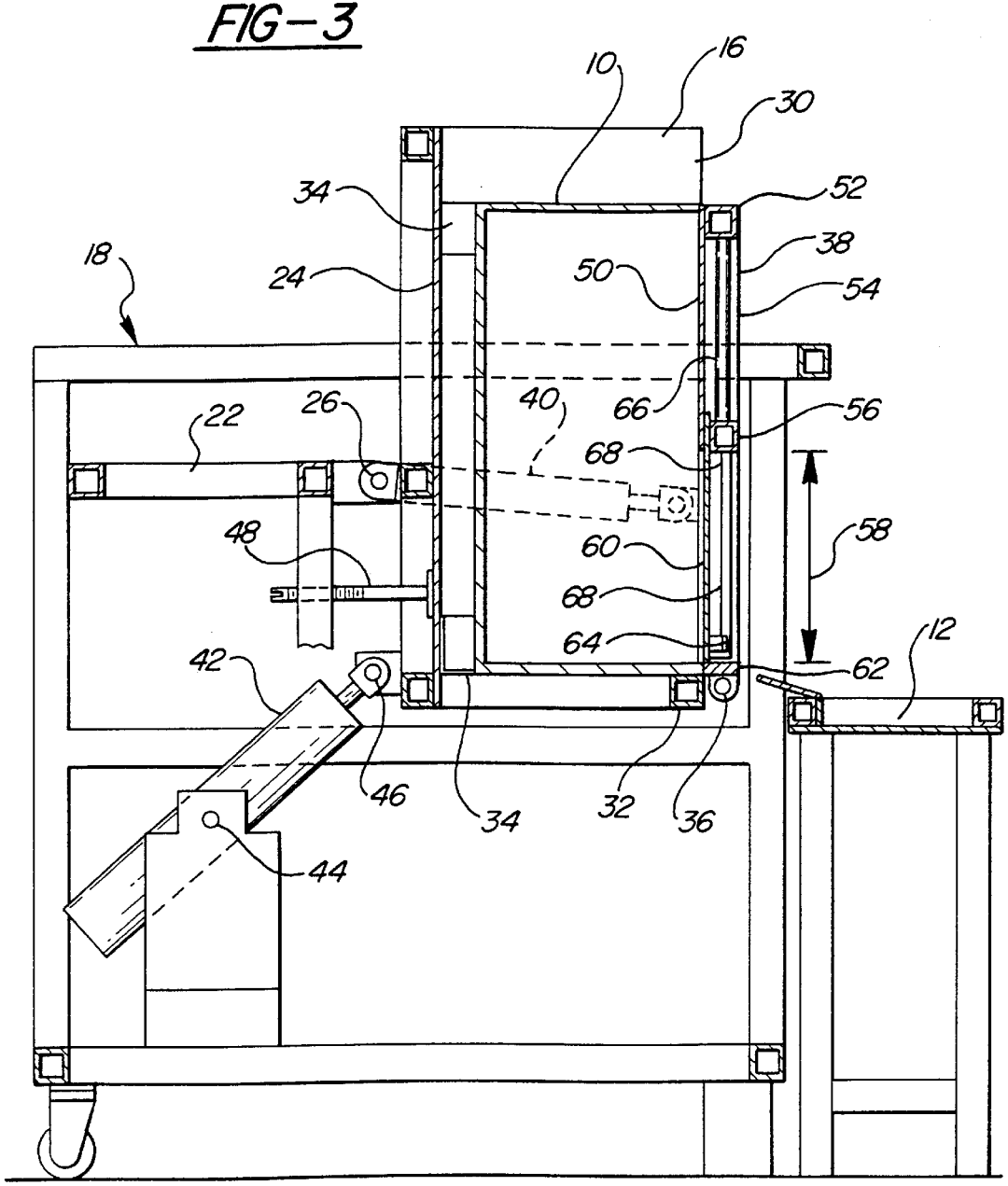

PARTS HANDLING APPARATUS

BACKGROUND AND SUMMARY OF THE INVENTION

1. Field of the Invention

This invention relates to an apparatus for delivering parts from a container to a receiving conveyor or work station in a graduated fashion. The invention has special utility in automotive factories or in manufacturing facilities where parts are machined or assembled on a repetitive mass production basis.

2. Description of Prior Developments

In automotive factories parts are machined or attached to other parts at individual work stations occupied by human technicians. Typically, the parts are taken from storage and transported to individual work stations in bulk containers that are borne on fork lift trucks. There is a problem involved in transferring the parts in orderly fashion from the container to a tray, or to a similar accessible storage device, at the work station. In many cases the loaded container is so large, or heavy, that it cannot be easily lifted off the fork lift truck for dumping the parts onto the work station tray. A mechanical power device is required to lift the container off the fork lift and dump the container onto the work station tray or bin.

U.S. Pat. No. 3,702,660, issued to W. L. Berger, shows a container-support cradle structure adapted to rock on a factory floor between a first position in which it receives a parts container, and a second position in which the container is laid on its side for discharge of parts through an enlarged opening in the cradle structure. One complication with the patented arrangement is that it can be difficult to completely empty the container without undue manipulation of the cradle structure. Another difficulty is that the parts are located relatively close to floor level, where the parts are not easily accessed.

U.S. Pat. No. 3,942,663, issued to R. Wentzel, shows an elevator support structure that includes tracks adapted to guide an elevator carriage for vertical and turning motions. A parts container deposited into the elevator carriage can be moved upwardly and then turned on its side to dump parts from the container into a bin structure located alongside the elevator support structure. The carriage is raised or lowered by means of a fork lift truck. One difficulty with the patented arrangement is that the parts dumping operation is relatively uncontrolled. All of the parts in the container are dumped while the container is being turned on its side. The parts are not discharged in a graduated controlled fashion.

SUMMARY OF THE INVENTION

The present invention relates to parts handling equipment that includes a carrier pivotally supported on a support frame for movement between an upright position for receiving a parts container and a tilted position for discharging parts out of the container. The carrier has a lid that can be raised to facilitate entry of the container into the carrier, or lowered to immobilize the container while the carrier is being moved to the tilted position. The lid has a slidable closure that can be opened to various positions for regulating the delivery of parts out of the container.

Further features of the invention will be apparent from the attached drawings and description of an illustrative embodiment of the invention.

BRIEF DESCRIPTION OF THE DRAWINGS

FIG. 1 is a sectional view taken through a parts handling apparatus constructed according to the invention.

FIG. 2 is a view taken in the same direction as FIG. 1, but showing the apparatus in a different adjusted position, after a parts container has been loaded into the apparatus.

FIG. 3 is an enlarged view, taken in the same direction as FIG. 1, but showing a carrier for the parts container in a tilted position suitable for discharging parts out of the container.

DESCRIPTION OF A PREFERRED EMBODIMENT OF THE INVENTION

The drawings show a handling apparatus for unloading parts from a parts container 10 onto a tray, or table, 12 in a controlled fashion. Typically, the parts container will hold a large number of parts, e.g., two hundred or more parts. The parts will be discharged from the container, a few parts at a time, onto the tray 12, such that the human operator can remove such parts, one at a time, for processing. The processing operation usually involves a manufacturing procedure, such as machining the part, connecting the part to another mating part, or loading the part into some processing machine. In the practice of the invention, table 12 can be a conveyor for transporting the part to some other location in the factory.

Container 10 can be a storage container originally loaded with parts at some other location, e.g., an original point of manufacture, in which case container 10 can be used as a shipping container in a truck, trailer or railroad car. As shown in FIG. 1, container 10 is supported on the forks 14 of a fork lift truck for delivery into an upright rectangular carrier 16 that forms part of the parts handling apparatus 18.

Apparatus 18 includes an upstanding frame 20 resting on a factory floor 21 for the purpose of pivotally supporting the rectangular carrier 16. The frame may be mobile or permanently anchored to the floor. The frame includes a platform 22 elevated above floor 21 to bear the weight of carrier 16. The carrier includes a bottom wall 24 that rests on platform 22 when the carrier is in the FIG. 1 position.

A pivotal connection 26 is provided between the bottom wall 24 of the carrier and frame 18, whereby the carrier can swing, or pivot, around the pivot connection between the FIG. 1 upstanding position and the FIG. 3 tilted position. The FIG. 1 position is sometimes referred to as the container-receiving position. The FIG. 3 position is at times referenced herein as the container-discharge position (meaning the position wherein parts are discharged from the container onto table 12).

As shown in FIG. 1, carrier 16 has a flat bottom wall 24 and two upstanding end walls, one of which is shown at 30 in FIG. 1. The two end walls are joined at their rear upper corners by a tubular cross piece 32. However, the space between cross piece 32 and bottom wall 24 is left open to accommodate the leading ends of the forks 14 when container 10 is being transported into carrier 16. The left end and upper end of the carrier are open, i.e., unobstructed, to permit easy entry of the parts container 10 into the carrier. The bottom 24 and end walls 30 of the carrier are preferably reinforced, with tubular reinforcing elements, as shown generally in FIG. 1.

The loaded parts container 10 is delivered into carrier 16 by suitable manipulation of the forklift truck, whereby the container assumes the position depicted in FIG. 2. The container has a raised bottom wall and feet 34 at its corners, and along its centerline, such that when the container has been deposited in carrier 16 the forks 14 can be withdrawn out of the carrier.

Carrier 16 has a hinged connection 36 with a lid 38, whereby the lid can be moved between the FIG. 1 raised position and the FIG. 2 lowered position. While the forklift is moving the parts container into carrier 16, lid 38 is in its raised position. After the container has been located in the carrier, lid 38 is lowered to the FIG. 2 position. In the FIG. 2 position, lid 38 closely overlies container 10 to immobilize the container and prevent premature discharge of parts out of the container when the carrier is tilted to the FIG. 3 position.

Lid 38 is powered between its raised and lowered positions by two fluid cylinders 40 trained between the lid and the carrier end walls 30. Each fluid cylinder 40 is located on the exterior surface of the associated carrier end wall, so that the entire interior carrier space can be occupied by container 10.

The pivotable connection 26 between the carrier bottom wall 24 and frame 12 is located at one edge of platform 22 and at an intermediate point along carrier wall 24. The pivotable connection 26 is, however, somewhat closer to the right edge of the carrier and further removed from the left edge of the carrier (as viewed in FIGS. 1 and 2), whereby the carrier is balanced in the direction that will cause the carrier to seat firmly on platform 22. The carrier overhangs platform 22, but is nevertheless stabilized on the platform because of the location of pivot connection 26.

Carrier 16 can be pivoted from the FIG. 2 position to the FIG. 3 tilted position when it is desired to discharge parts from container 10 onto table 12. A fluid cylinder arrangement 42 is provided for moving the carrier around pivot connection 26. Preferably, the fluid cylinder arrangement includes two similarly constructed fluid cylinders spaced equidistant from the carrier centerline (plane of the paper in FIGS. 1 through 3). Each fluid cylinder 42 has a pivot connection 44 with frame 20 and a pivot connection 46 with carrier 16.

Each fluid cylinder 40 or 42 may be an air-operated double-acting cylinder of conventional construction. The tilting motion of carrier 16 to the FIG. 3 position can be limited by suitable adjustable stops 48.

As shown in FIG. 3, lid 38 includes a panel 50 secured to a tubular reinforcing element 52 along one edge of the lid. Additional reinforcing elements 54 are provided along the end edges of panel 50. A tubular cross bar 56 extends between the reinforcing elements 54 to further reinforce the lid.

Panel 50 extends approximately one half the distance from reinforcing element 52 to hinged connection 36, to provide a parts discharge opening having a height dimension 58. A flat closure plate, or gate, 60 is slidably supported on the lid for opening or closing the parts discharge opening.

As shown in FIG. 3, closure plate 60 has an upper edge overlapping the tubular reinforcement 56, and a lower edge abutting a sill element 62 that is aligned with one wall of the parts container 10. A handle 64 on plate 60 can be manually grasped to raise the closure plate from its illustrated position, whereby the loose parts in container 10 can be discharged onto table 12.

Various guide mechanisms can be used to provide slidable guidance for closure plate 60. As shown in FIG. 3, the guide mechanism includes a guide tube 66 extending between tubular reinforcements 52 and 56, and a telescoping rod 68 anchored to the lower edge area of closure plate 60; rod 68 is slidable in tube 66 to guide the gate and prevent any tendency of the gate to cock. Two telescoping tube-rod assemblies are used, one near each side edge of closure plate 60.

Suitable bullet-type latches are provided on closure plate 60 for retaining the closure plate in various partially-open positions, whereby the size of the parts discharge opening is variable in accordance with the quantity of parts required to be deposited onto table 12 when the closure plate is operated. Preferably the latches are connected to handle 64 so that the person can operate the latches as part of the closure plate-raising process.

Edge areas of closure plate 60 are in slidable contact with tubular reinforcements 54 and 56, such that the tubular reinforcements provide back-up support for plate 60. The plate is supported against outward buckling by the force of the parts in container 10.

When container 10 is in an empty condition fluid cylinders 42 are actuated to return carrier 16 to the FIG. 2 position. Cylinders 40 are then actuated to raise lid 38 to the FIG. 1 condition. The empty container 10 can then be removed from carrier 16 and replaced with a loaded container, using a fork lift truck as the transporting mechanism.

The invention is advantageous in that the parts can be delivered to table 12 in a relatively controlled fashion, such that the table is not overloaded with parts at any one time. The slidable closure plate 60 moves vertically across the discharge opening at right angles to the movement direction of the parts through the opening. The closure plate can be opened or closed without undue resistance associated with the weight of the parts.

As an extension of the invention, closure plate (gate) 60 could be power-operated such as with fluid operated cylinders. However, manual operation is suitable and sufficient for many situations.

In a preferred practice of the invention, parts container 10 is a shipping container that is loaded with parts at a supplier factory. The loaded container is moved from the supplier factory to the FIG. 1 work station without transferring the parts from one container to another container at any point in the parts supply process. This concept greatly reduces the cost and time expenditure of the parts handling operation.

Many modifications and variations of the present invention are possible in light of the above teachings. Therefore, within the scope of the appended claims, the present invention may be practiced other than specifically described.

What is claimed is:

1. Parts handling equipment comprising:

a support frame;

a carrier pivotally mounted on said frame for movement between an upstanding container receiving position, and a tilted container-discharge position;

a parts container transportable into said carrier when said carrier is in its upstanding position;

said carrier having a raiseable lid that is lowerable onto said container after said container has been transported into said carrier; said lid having a closure that can be moved to an open position to control the flow of parts out of said container when said carrier is in the tilted position;

a first fluid cylinder means for moving said carrier between its container-receiving position and its tilted container-discharge position; and a second fluid cylinder means for raising or lowering said lid when said carrier is in its container-receiving position.

2. The parts handling equipment of claim 1, wherein said carrier has a pivoted motion of approximately ninety degrees when moving between the container-receiving position and the tilted container-discharge position.

3. The parts handling equipment of claim 1, wherein said closure is slidably mounted on said lid.

4. The parts handling equipment of claim 1 wherein said lid has a hinged connection with said carrier, and a parts discharge opening proximate to said hinged connection; said closure comprising a gate slidably supported on said lid for opening or closing said parts discharge opening.

5. Parts handling equipment comprising:
a support frame;
a carrier pivotally mounted on said frame for movement between an upstanding container receiving position, and a tilted container-discharge position;
a parts container transportable into said carrier when said carrier is in its upstanding position;
said carrier having a raiseable lid that is lowerable onto said container after said container has been transported into said carrier; said lid having a closure that can be moved to an open position to control the flow of parts out of said container when said carrier is in the tilted position; and
wherein said carrier has a bottom wall adapted to underlie the parts container when said container is transported into said carrier; said container having a pivotal connection with said support frame located at an intermediate point along the carrier bottom wall.

6. The parts handling equipment of claim 5, wherein said frame comprises a platform adapted to support said carrier in the upstanding container-receiving position; said pivotal connection being proximate to an edge of said platform so that said container is balanced in the direction that biases the carrier downwardly onto said platform.

7. The parts handling equipment of claim 5, wherein said frame comprises a platform adapted to support said carrier when said carrier is in the container-receiving position; said pivotal connection being proximate to an edge of said platform so that said carrier overhangs said platform in the container-receiving position.

8. Parts handling equipment comprising:
a support frame;
a carrier pivotally mounted on said frame for movement between an upstanding container-receiving position, and a tilted container-discharge position;
a parts container transportable into said carrier when said carrier is in its upstanding position;
said carrier having a raisable lid that has a hinged connection to said carrier for movement of said lid between a raised position and a lowered position overlying said container after said container has been transported into said carrier;
said lid having a parts discharge opening proximate to said hinged connection, and a gate slidably supported on said lid for opening or closing said parts discharge opening;
said frame comprising a platform adapted to support said carrier in the container-receiving position; said carrier having a pivotal connection with said frame proximate to an edge of said platform, whereby said carrier overhangs said platform in the container-receiving position;
a first fluid cylinder arrangement trained between said frame and said carrier for moving said carrier between its container-receiving position and its tilted container-discharge position; and
a second fluid cylinder arrangement trained between said carrier and said lid for moving said lid between its raised and lowered positions.

9. The parts handling equipment of claim 8, wherein said parts container is a shipping container having spaced feet and a raised bottom wall, whereby said container is transportable into said carrier by means of a fork lift truck.

10. The parts handling equipment of claim 8, wherein said lid has tubular reinforcements extending along edge areas of said parts discharge opening; said gate having slidable contact with said tubular reinforcements, whereby the tubular reinforcements provide back-up support for the gate.

11. Parts handling equipment comprising:
a support frame;
a carrier pivotally mounted on said frame for movement between an upstanding container receiving position, and a tilted container-discharge position;
a parts container transportable into said carrier when said carrier is in its upstanding position;
said carrier having a raiseable lid that is lowerable onto said container after said container has been transported into said carrier; said lid having a closure that can be moved to an open position to control the flow of parts out of said container when said carrier is in the tilted position and wherein said lid has a hinge connection with said carrier and further comprising a fluid cylinder means located between said carrier and said lid for mounting said lid between a raised position and a lowered position.

* * * * *